Patented Jan. 5, 1937

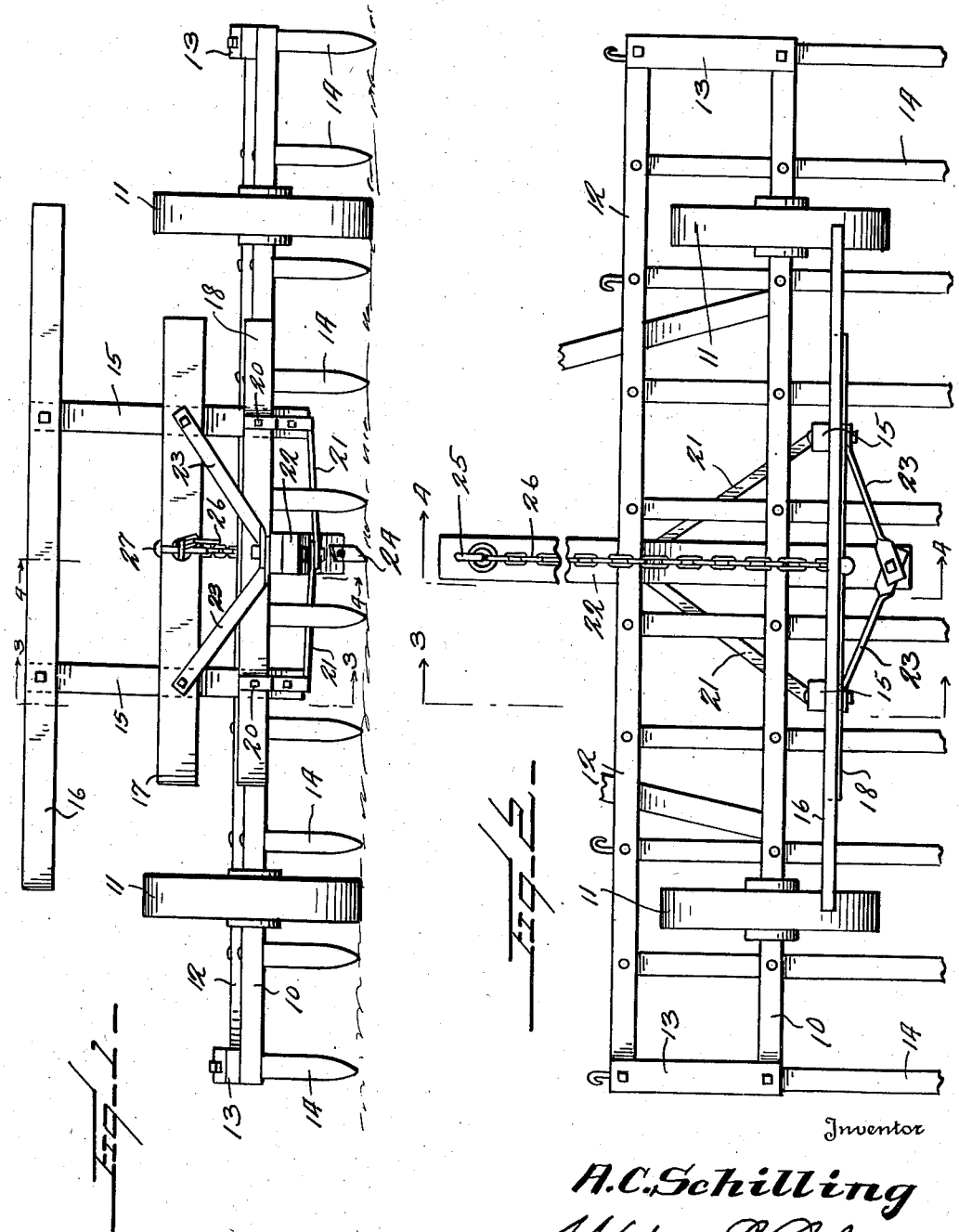

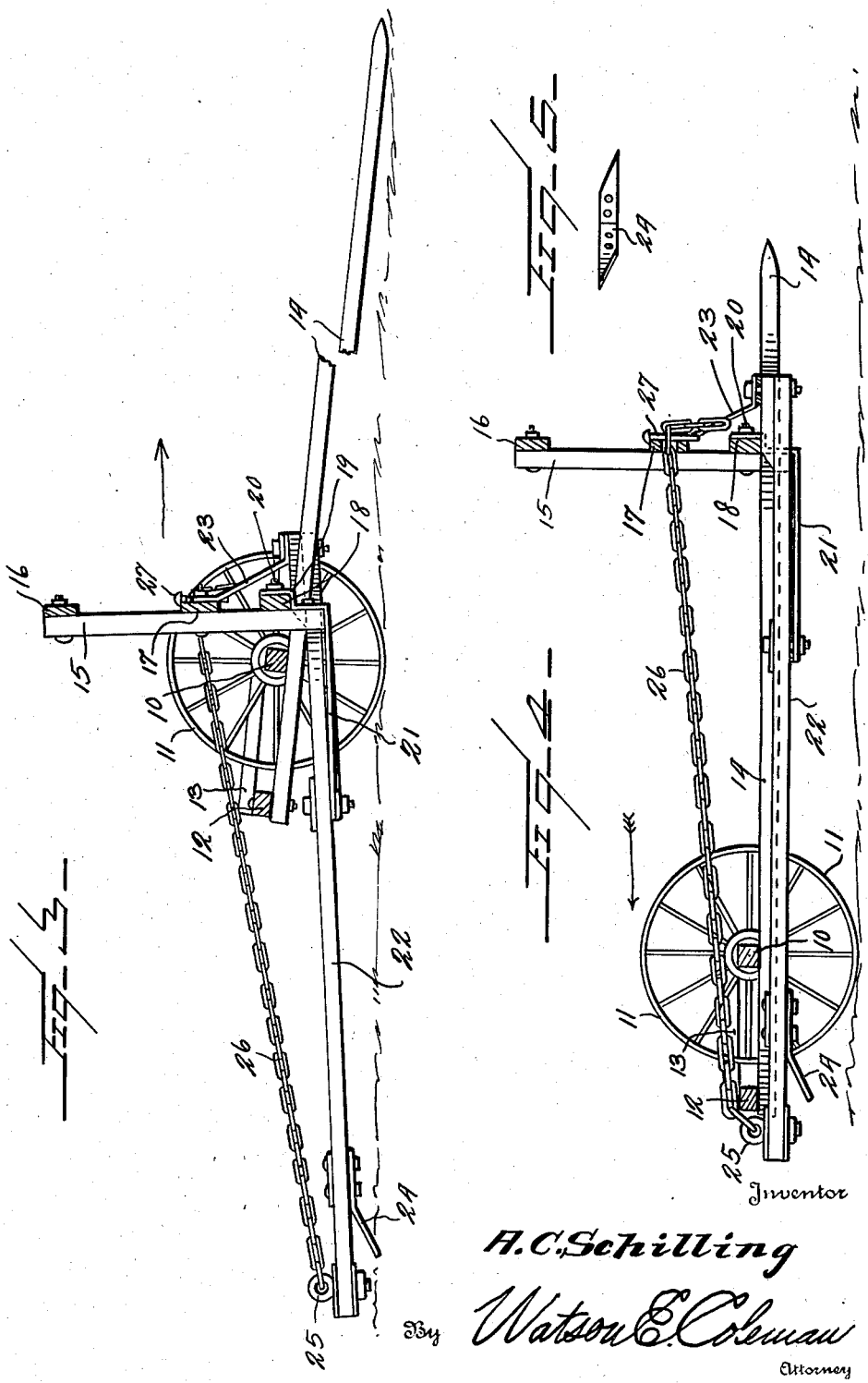

2,067,099

UNITED STATES PATENT OFFICE 2,067,099

DISCHARGING ATTACHMENT FOR HAY SWEEPS

Albert C. Schilling, Avon, Mont.

Application December 31, 1934, Serial No. 759,976

6 Claims. (Cl. 56—396)

This invention relates to hay and straw gathering devices which are known as hay sweeps or bull rakes. These structures usually consist of a frame having downwardly and forwardly extending spaced teeth, the forward ends of which travel on the ground, the frame itself being connected by any suitable means to draft animals which push the gatherer over the ground until the desired amount of hay has been gathered upon the teeth. The gatherer is then pushed to a stack and the gatherer pulled rearward which is supposed to leave the hay at or on the stack. As a matter of fact, structures of this character, unless provided with specific means for discharging the hay, do not operate readily. When the gatherer is retracted it usually pushes a large amount of hay back with it and an operator has to stand nearby and push the hay off of the teeth of the gatherer as it is retracted. This takes some time and requires a good deal of manipulation of the rake in order to secure the result aimed at.

The general object of my invention is to provide means whereby the hay may be held against rearward movement when the rake is backed off, and provide these means in the form of an attachment which may be readily applied to the usual bull rake without in any way changing the structure of the bull rake.

A further object is to provide an attachment of this character which embodies an upwardly extending frame portion constituting an ejector for the hay on the rakes and thru which the rake teeth pass, this upwardly projecting portion having a rearwardly extending beam provided at its rear end with a downwardly and rearwardly extending tooth or prong engageable in the ground to prevent the beam from moving rearward when the teeth of the rake are retracted by the draft animals and in this connection a further object is to provide means whereby the rear portion of this beam will be elevated automatically when the teeth are fully retracted, to thus put the machine in condition for further use.

Other objects will appear in the course of the following description.

My invention is illustrated in the accompanying drawings, wherein:—

Figure 1 is a front elevation of a hay sweep having my attachment applied thereto.

Fig. 2 is a top plan view of the hay sweep with my attachment.

Fig. 3 is a longitudinal sectional view thru the sweep and attachment showing the teeth of the sweep projected into raking position, the machine moving forwardly.

Fig. 4 is a like view to Fig. 3, but with the teeth fully retracted and the rear end of the attachment raised.

Fig. 5 is an underside plan view of the ground engaging teeth.

Referring to these drawings, it will be seen that the sweep itself includes a transversely extending beam 10 constituting in effect an axle and upon which the wheels 11 are mounted. The beam 10 is connected to a rear beam 12 by means of longitudinal members 13 and by means of the teeth 14 which are bolted or otherwise attached to the members 10 and 12. These teeth project forward a considerable distance beyond the axle beam 10 and therefore naturally tend to extend downward and forward into contact with the ground.

Appliances of this character usually have a rearwardly extending tongue or beam to which a transverse draft bar is attached, the draft animals being disposed in front of this draft bar and on each side of the draft beam or tongue and immediately behind the element 12. Inasmuch as this is common to practically all sweep or bull rakes I have not illustrated this beam nor the draft attachment, it being understood of course that the rake is pushed forward with the draft animals behind the rake.

My rake clearing attachment comprises vertical members 15 constituting a rack and connected at their upper ends by a transverse beam 16 which may extend any desired distance, as for instance, the distance equal to the width of the beams 12 and 10, but which is shown as of less length. Bolted upon the vertical members 15 and below the beam 16, is a transverse beam 17 and disposed below the transverse beam 17 is a transverse beam 18 which is held in engagement with the vertical members 15 by the angular irons 19. These irons are disposed in front of the uprights 15 and extend upward in front of the beam 18 and are bolted thereto and to the uprights 15 by bolts 20. The irons then extend downward below the lower edge of the vertical members 15 and then extend inward and rearward in convergent relation to each other, as at 21, and are bolted or otherwise attached to the rearwardly extending beam 22. The beam 22 extends beneath the beam 18, and beyond the same is connected to the transverse bar 17 by means of the irons 23 which extend upward laterally and rearwardly and which at their upper ends are bolted to the bar 17. The rear end of the beam 22 carries upon it the downwardly and rearwardly extending tooth 24, this tooth being angularly bent at its middle, as shown in Figs. 3 and 5, and being sharpened at both ends so that when one portion of the tooth is bolted to the beam 22, the other portion will extend downward and rearward and when the point of this portion is worn off, this member 24 may be reversed so as to bring the other point into action, thus permitting this tooth or prong 24 to do double duty.

Attached to the rear end of the beam 22, as for instance by the eye 25, is a chain 26 which extends upward and forward at an angle to the beam 22, and at its forward end extends through the transverse bar 17 and is engaged by a pin 27 as shown in Fig. 4. This chain may be thus tightened or loosened, as the necessities of any particular case may require.

In the operation of this sweep with the attachment, the sweep is pushed forward with the teeth 14 extended, as shown in Fig. 3, to gather hay or straw upon the teeth in the usual manner. At this time the beam 22 extends downward toward the ground rearward of the sweep frame, and the prong 24 travels upon the surface of the ground. When a sufficiency of hay has been gathered upon the teeth and the machine is moved to the stack and it is desired to eject or discharge the hay from the teeth 14, the draft animals pull the sweep frame rearward from the position shown in Fig. 3 to the position shown in Fig. 4. When the beam 12 strikes the chain 26, it exerts a lifting force which lifts up on the rear end of the beam 22 lifting the prong 24 out of the ground. It will be seen that until this happens, the prong 24 prevents any rearward movement of the beam 22 and of the ejector or discharger formed on the members 15, 16 and 17. Of course, this action discharges the hay from the teeth 14. After the hay has been discharged and the machine pulled away from the stack, the draft animals move forward, thus shifting the rake teeth forward and projecting them in the manner shown in Fig. 3, and the machine is again ready for use.

While I have illustrated a chain 26 connecting the bar 17 with the rear end of the beam 22, it is obvious that a cable or even rope might be used in place of the chain 26, I do not wish to be limited to the details of construction shown except as defined in the appended claims, as obviously modifications might be made with regard to the members 15, 16 and 17 without departing from the spirit of the invention as defined in the appended claims.

Having thus described my invention, what I claim, is:

1. A sweep rake including parallel rake teeth, members connecting said rake teeth to each other and including an axle and a rear transverse member attached to the rake teeth and wheels mounted upon the axle, an ejector comprising a plurality of vertical members, transverse members connecting said vertical members, certain of the teeth passing between the vertical members of the ejector, a rearwardly extending beam attached to the ejector and having a ground engaging downwardly and rearwardly extending prong at its rear end, a taut element connected at its rear end to the rear end of said beam and extending upward and forward at an inclination above the connecting member on the rear ends of said teeth and attached at its forward end to one of the transverse members of the ejector, a rearward movement of the rake frame causing the rear transverse member of the rake frame to engage said element as the rake teeth approach their fully retracted position and thus automatically depress the rear ends of the rake teeth and simultaneously lift the rear end of the beam and its prong from the ground.

2. The combination with a wheel supported sweep rake, of an ejector supported on but movable longitudinally with relation to the rake including a rearwardly extending beam having a ground engaging prong, and coacting means carried by the rake and beam constructed and arranged to automatically lift the rear end of the beam and thereby lift the prong from the ground when the rake has been moved inward and approaches its fully retracted position.

3. The combination with a sweep rake, of an ejector supported on but movable longitudinally with relation to the rake and including a rearwardly extending beam having a ground engaging prong at its rear end and an upwardly extending rack at the forward end of the beam, an inclined element extending downward and rearward from the rack to the rear end of the beam, and a rake having a member constructed and arranged to engage the under face of said inclined element when the rake is moved rearward relative to the ejector and approaches its fully retracted position to thus raise the rear end of the beam and lift the prong out of engagement with the ground.

4. The combination with a sweep rake having a plurality of longitudinally extending teeth, a transverse member carried at the rear end of the teeth and wheels supporting the rake, of an ejector supported on but movable longitudinally with relation to the rake and including an upwardly extending rack and a beam extending rearwardly from the lower end of the rack, the beam having a ground engaging prong at its rear end, certain of the teeth of the rake passing through the rack, and a downwardly and rearwardly inclined element attached at its forward end to said rack and at its rear end to the rear end of the beam, the rear end of said element being disposed in the path of movement of the transverse member on the rake whereby as the rake moves rearward and nears its rearmost position, the transverse member will engage the inclined element and thus lift the rear end of the beam and lift the prong from the ground.

5. The combination with a sweep rake having longitudinally extending rake teeth, wheels supporting the rake teeth and a transverse member carried at the rear end of the rake teeth, of an ejector supported on but movable longitudinally with relation to the rake and including an upwardly extending rack and a beam extending rearwardly from the lower end of the rack and carrying a ground engaging prong at its rear end, a taut element attached at its rear end to the rear end of the beam and engaged at its forward end with said rack at a point above the level of the beam whereby the taut element is inclined downward and rearward, the rear portion of the taut element being disposed in the path of movement of the member carried on the rear end of the rake whereby as the rake is moved rearward relative to the ejector and approaches its fully retracted position, the member on the rake will engage against the under face of the taut element to thus cause the lifting of the rear end of the beam and the lifting of the prong out of the ground.

6. An ejector attachment for sweep rakes, comprising a rack having a rearwardly extending beam, rake teeth extending through the rack and operatively connected to each other as a unit, a transverse member carried by said rack and adapted to rest upon the rake teeth, a downwardly and rearwardly extending prong carried by the rear end of the beam, and a taut element connected at its rear end to the rear end of the beam and extending upward and forward and connected to the rack.

ALBERT C. SCHILLING.